Jan. 21, 1969   R. B. PITTMAN   3,423,720
COLOR KINESCOPE SOCKET
Filed March 28, 1967   Sheet 1 of 2
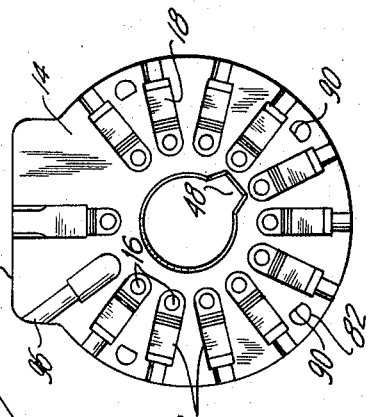
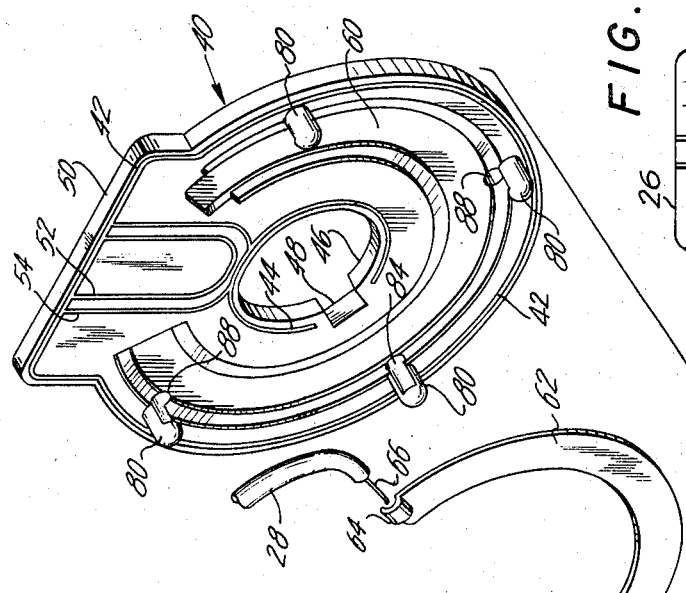
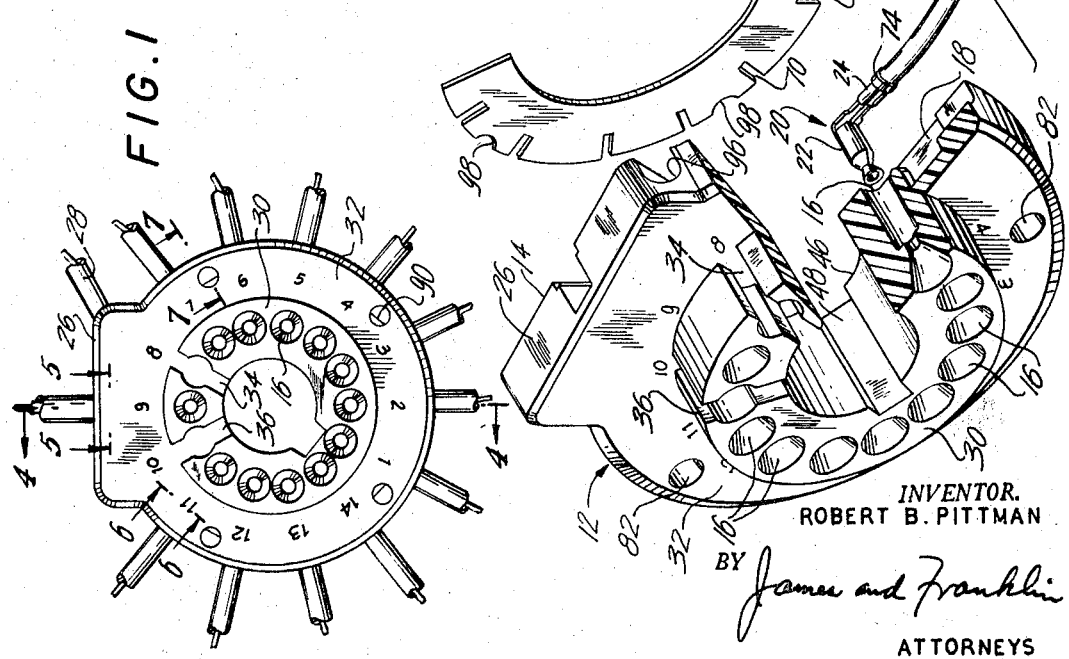
INVENTOR.
ROBERT B. PITTMAN
BY James and Franklin
ATTORNEYS

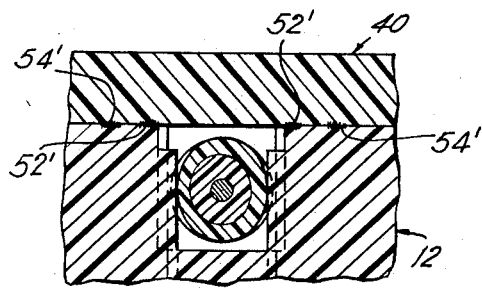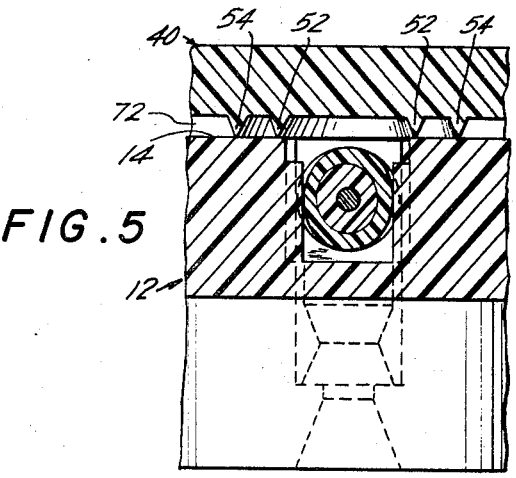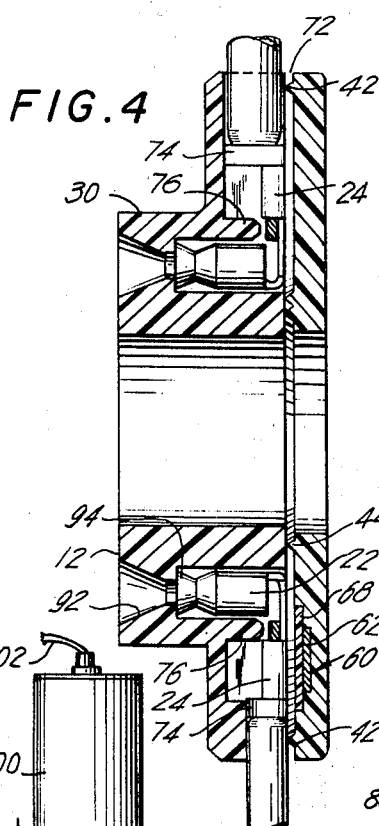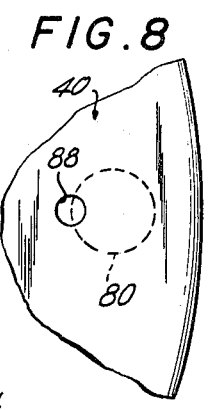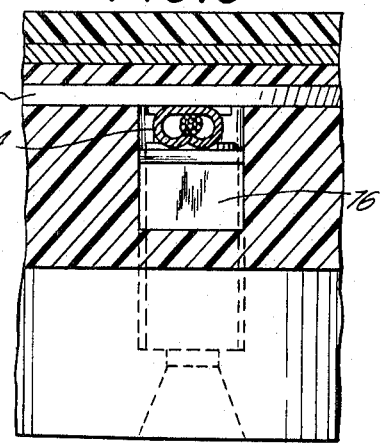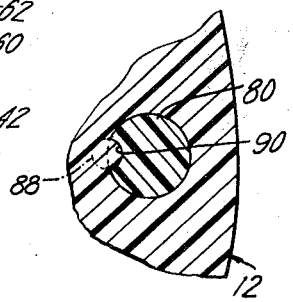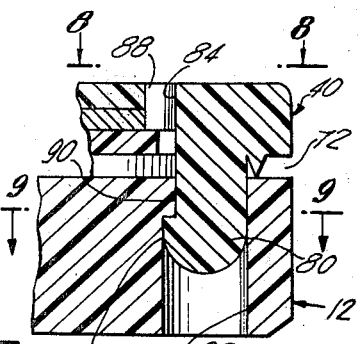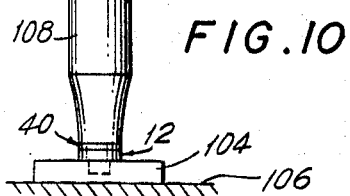
INVENTOR.
ROBERT B. PITTMAN
BY James and Franklin
ATTORNEYS

United States Patent Office 3,423,720
Patented Jan. 21, 1969

3,423,720
COLOR KINESCOPE SOCKET
Robert B. Pittman, River Edge, N.J., assignor to Industrial Electronic Hardware Corp., New York, N.Y., a corporation of New York
Filed Mar. 28, 1967, Ser. No. 626,550
U.S. Cl. 339—143
Int. Cl. H01r 5/02, 3/00
14 Claims

ABSTRACT OF THE DISCLOSURE

This socket for a color kinescope has a ring of metal contacts, including a high voltage contact, all housed in a molded body, and held in the body by a molded cover which is secured to the body by ultrasonic welding instead of by rivets. The cover as molded has welding ridges including one or more ridges acting as a voltage barrier around the high voltage contact. The cover has locking posts which hold the assembly together during the welding operation. There is spark gap protection at any desired contact.

BACKGROUND OF THE INVENTION

Color kinescope tubes have a ring of pins, including one high voltage pin. The socket comprises a body and a cover housing a ring of metal contacts which receive the pins. Usually there is an extra leakage barrier around the high voltage pin, this being a deep V shaped wall projecting from the body and passing through and beyond a V shaped slot in the cover. The cover usually is riveted to the body. It is already known to provide a protective spark gap action by means of a grounding plate spaced from the contacts, but the breakdown voltage was not accurately determinable, because of warping of the riveted cover.

SUMMARY OF THE INVENTION

In the improved socket the troublesome deep V shaped leakage barrier is eliminated and replaced by one or more collateral welding ridges around the location of the high voltage terminal, these ridges being flattened and becoming integral welds when the cover and body are secured together by ultrasonic welding. The entire cover is secured without the use of rivets by means of a peripheral welding ridge at the outer periphery and another around the center hole. The cover as molded preferably has locking posts, and the body has mating holes to receive the posts with a snap engagement, thereby holding the assembly together to facilitate handling before and during the welding operation.

To protect any desired electrode in the kinescope against overload voltage, the socket is arranged for a spark gap or voltage breakdown action. For this purpose the cover of the socket has an arcuate recess which is generally circular, but interrupted outside the barrier welds around the high voltage contact, and this recess receives an arcuate metal ground plate and an arcuate insulation spacer, the latter being apertured or slotted at the location of any contact which is to be protected by spark gap action (meaning protection of that electrode inside the kinescope which is connected to the said contact).

The spacer is made of a hard material having good insulating properties, preferably "glass melamine" (meaning melamine with a glass fibre filler), and its thickness may be varied and is selected to obtain a desired breakdown voltage. The thickness of the metal ground plate is oppositely varied, and is so selected that when added to the thickness of the insulation spacer, the summed thickness equals the depth of the recess in the cover. The spacer is preferably wider than the ground plate, and the arcuate recess in the cover has a narrower deeper portion dimensioned to receive and locate the ground plate, and a wider portion dimensioned to receive and locate the spacer.

The locking posts are generally cylindrical, but have a flat or a channel at the inner side of the post which stops short of the tip in order to provide a desired enlarged head. This channel conforms to a hole passing through the cover, so that it may be molded by fixed molding pins. The holes in the body for receiving the posts are cylindrical in the part nearer the inner face, but are flattened in the part nearer the outer face, in order to provide the desired snap engagement with the enlarged heads of the locking posts.

The foregoing and additional features are described in the following detailed specification, which is accompanied by drawings, in which:

FIG. 1 is an elevation looking toward the inner face of the color kinescope socket;

FIG. 2 is an exploded perspective view showing the parts of the socket;

FIG. 3 is an elevation looking toward the outer face of the insulation body;

FIG. 4 is a diametrical section taken on the line 4—4 of FIG. 1, and drawn to larger scale;

FIG. 5 is a fragmentary section taken on the line 5—5 of FIG. 1, before welding;

FIG. 5A is a similar fragmentary view after welding;

FIG. 6 is a fragmentary section taken on the line 6—6 of FIG. 1;

FIG. 7 is a fragmentary section taken on the line 7—7 of FIG. 1;

FIG. 8 is a fragmentary view looking in the direction of the arrows 8—8 of FIG. 7;

FIG. 9 is a fragmentary section taken on the line 9—9 of FIG. 7; and

FIG. 10 represents the ultrasonic welding operation.

Referring to the drawing, and more particularly to FIGS. 1, 2 and 3, the socket comprises a molded body 12 having a generally flat outer face 14 (FIG. 3). There is a ring of axially directed holes 16, with channels 18 extending outwardly from the holes, these channels being open to the rear face 14. The body 12 receives a ring of metal contacts 20 (FIG. 2), each having an axially directed pin grip 22, which is received in a hole 16, and each having a wire clamp portion 24 which is received in a channel 18. The body 12 is generally circular, but is enlarged at the part 26 which is the location of a high voltage contact.

In the socket here shown there is provision for twelve contacts, located at the angular spacing for fourteen, there being no pin grip contact at each side of the high voltage contact. In FIG. 1 there are molded numerals 1 through 14, and the high voltage contact is at #9. These numbers are arbitrary and are for convenience of reference. There is no pin grip contact at #8 and #10. There is a lead wire 28 at position #8, but this is for a ground plate described later.

The inner face of the socket has a raised annular portion 30, which provides adequate room in axial direction for the pin grips 22, but this extra thickness is not needed for the lead wires, and the body 12 is thinner in the outer portion 32 outside the annular portion 30. The annular portion 30 is deeply cleft at 34 and 36, corresponding to the positions #8 and #10. This is done because some color kinescope tubes have voltage barrier fins at each side of the high voltage pin, and such fins then are received in the clefts or slots 34 and 36.

The outer face 14 of the molded body is closed by a molded insulation cover 40. This is secured to the body by welding and without the use of rivets. For this purpose the inside face of the cover 40 has a peripheral welding ridge 42 (FIG. 2) at its outer periphery, and another welding ridge 44 around the large center hole 46, this hole having the usual keyway 48 to mate with a keyed post on the kinescope. The welding ridges could be on the body instead of on the cover.

The enlargement 50 of the cover, which mates with the enlargement 26 of the body, has one or more collateral welding ridges 52 and 54, around the location of the high voltage terminal, that is, around position 9 as viewed in FIG. 1. These are so effective that it is no longer necessary to use the deep V shaped barrier heretofore used.

All of these ridges are flattened or disappear and become integral welds when the cover and body are secured together by ultrasonic welding, and it is found that the welded barrier 52, 54 is superior to the usual deep barrier wall heretofore employed. FIG. 5 shows the barrier ridges 52 and 54 prior to welding, and FIG. 5A shows the subsequent welds at 52′ and 54′. The material used for the socket may be almost any thermosetting plastic, and may be selected primarily for its electrical properties. In the particular case here shown it is a flame-retardant polypropylene, which is more difficult to weld than many other plastics, but has good electrical properties. During the welding operation the material fuses or coalesces and becomes integral. Ultrasonic welding localizes the desired fusion to the ridge, without softening or deformation of the main body and cover of the socket.

The present socket is designed to protect the kinescope against overload voltage at any one or more of the contacts (other than the high voltage contact). In a typical case, the screen of the kinescope may receive a voltage of say 25,000 volts through a separate anode lead (not shown); the high voltage contact at position #9 in FIG. 1 may receive a voltage of say 15,000 volts; and some or all of the other contacts may be protectively limited to a voltage of say 2,300 volts. This is done by voltage breakdown or spark gap action at such contacts.

For this purpose the inner face of the cover 40 has an arcuate recess 60 (FIG. 2), which is generally circular, but interrupted outside the welding ridges 52 and 54. An arcuate metal ground plate 62 is received in the recess 60, and is connected to a ground lead 28 (FIGS. 1 and 2). As here illustrated, this is secured by clamping a tab 64 around the bared metal end 66 of lead 28. Lead 28 is received in channel 96. There is an arcuate insulation spacer 68 disposed over the ground plate 62, and this is apertured at the location of a contact which is to be protected. The aperture may be a slot as indicated at 70, and in the present case such a slot is shown at each contact, as though all are to be protected. In actual practice, the die which stamps the spacer 68 has removable inserts for forming the slots 70. The television set manufacturer purchasing the socket specifies which contacts are to have the spark gap action, and only the appropriate inserts are used for slots 70 in his sockets.

The breakdown voltage is determined by the thickness of the spacer 68, and it is therefore preferably made of a hard material having good insulation qualities. In the present case it is a melamine plastic loaded with a glass fibre filler. In a typical case, a thickness of 0.016 inch may be used, which corresponds to a breakdown voltage of about 2,300 volts.

The purchaser may specify the breakdown voltage, and the thickness of spacer 68 may be appropriately varied. In such case, however, the thickness of the metal ground plate 62 is oppositely varied, its thickness being so selected that when added to the thickness of the spacer 68, the summed thickness equals the depth of the recess 60 in the cover 40.

To prevent undesired voltage breakdown at the edges of the ground plate 62, the spacer 68 is preferably made wider, in radial direction, than the ground plate 62. The arcuate recess 60 has a narrower deeper portion dimensioned to receive and to locate the ground plate 62, as is best shown in the lower part of FIG. 4, and the recess has a wider portion which is dimensioned to receive and locate the spacer 68. The step in the recess 60 is so located as to receive a spacer 68 of the maximum thickness expected to be used.

In FIGS. 4 through 7 the parts are shown prior to the welding operation, and therefore a space is shown at 72 between the cover and the body. However, after the welding operation this space disappears, and the parts come into face-to-face relation as shown in FIG. 5A. At this time the spark gap rings 62 and 68 (FIGS. 2 and 4) are clamped snugly between the body and cover, and have a definite fixed position. Moreover, the spacer 68 rests on the contacts, and to help insure this, the outermost part of the wire clamp of the contact, that is, the part which is clamped around the insulation of the wire, has a height which just fills the part of the channel receiving the same, as shown at 74 in FIG. 4. The spark gap aperture or slot (70 in FIG. 2) is located over the part 74 of the contact, and thus the spark gap distance is accurately fixed.

The part 24 of the metal contact is clamped tightly around the bared wire end. This is also shown in FIG. 6. The body 12 has a bridge at 76 (FIG. 4) which enters the space between the pin grip 22 and the clamp part 24, and so helps additionally anchor the contact in the socket.

The cover 40 is molded with a plurality of locking posts 80 (FIG. 2), in this case four, and the body 12 has four mating holes 82 to receive the locking posts. The posts are headed, and the holes 82 are appropriately shaped to receive the headed posts with a snap engagement which allows for the presence of the welding ridges, as is best shown in FIG. 7. This locking action is a great convenience, because it holds the body and cover together, with the spark gap rings and metal contacts and lead wires held therebetween, thus facilitating handling of the socket before and during the welding operation.

As here illustrated, the locking posts 80 are generally cylindrical, but each has a channel 84 (FIGS. 2 and 9) at the inner side of the post, which channels stop short of the tip in order to provide the desired enlarged head 86. The channel 84 conforms to a circular hole 88 (FIGS. 2, 7 and 8) which passes through the cover 40. Thus, the seemingly undercut head 86 is formed by fixed pins in the mold, without requiring movable cores. The posts could have flats, but here the fixed molding pins are simple round pins which form the holes 88.

The holes 82 in the body for receiving the posts are cylindrical in the part nearer the inner face, as will be seen in FIGS. 2 and 7, but they are slightly flattened as shown at 90 in FIGS. 1, 3 and 7, in the part nearer the outer face, in order to provide the desired snap engagement with the enlarged heads 86 of the locking posts 80. The holes 82 with the flattened parts 90 also may be molded by means of fixed pins when molding the body. During the welding operation the enlarged head 86 (FIG. 7) moves inward somewhat as the space at 72 is eliminated, but this is of no consequence because the parts of the socket then are securely welded together.

The posts could be molded on the body, instead of on the cover, in which case the cover would have the mating holes, but the illustrated arrangement is preferred.

Each pin hole preferably has a convergent mouth best shown at 92 in FIG. 4. The pin grip also has a convergent mouth shown at 94 in FIG. 4, and the latter supports the pin grip against movement when removing the socket from the kinescope. The channel 96 (FIGS. 2 and 3) receives the ground wire 28 (FIG. 2) as shown in FIG. 1.

The four notches shown at 98 in FIG. 2 serve to clear the four posts 80 and help orient the position of spacer 68, in addition to its location by means of the recess 60.

The ultrasonic welding step is schematically indicated in FIG. 10. The particular unit shown is part of a Branson "Sonifier" made by Branson Instruments, Inc. of Danbury, Conn. The vibrator or converter (transducer) unit is indicated at 100, and its electrical supply is through a flexible cable 102. This unit is clamped in an air operated press adapted to move the unit vertically toward or away from the work. A stationary fixture or holder is indicated at 104, this being mounted on the press table 106, and having an aperture which receives the annular raised part 30 (FIGS. 1 and 2) of the socket. The power supply, the timer switch, and the air cylinder are not shown. They form part of the commercially available Branson equipment. The tool or "horn" which is vibrated and resonates at ultrasonic frequency, say 20,000 cycles per second, is shown at 108 (FIG. 10), and its lower end is dimensioned to bear against the flat back of the socket cover 40. As previously explained, the vibration generates heat which is localized and causes fusion at the welding ridges, but there is no deformation of the socket itself.

It is believed that the construction and method of assembly of my improved color kinescope socket, as well as the advantages thereof, will be apparent from the foregoing detailed description. It will also be apparent that while I have shown and described the socket in a preferred form, changes may be made without departing from the scope of the invention, as sought to be described in the following claims. In the claims the reference to welding ridges on the cover is not intended to exclude the equivalent location on the body, and the same applies to the posts.

I claim:

1. A socket for a color kinescope comprising a molded body having a generally flat outer face, a ring of axially directed holes with channels extending outwardly therefrom, a ring of metal contacts with axially directed pin grips received in said holes and with wire clamps received in said channels, said body being generally circular but enlarged radially at a high voltage contact, a molded cover which on the inside face as molded has one or more collateral welding ridges around the location of the high voltage terminal, these ridges being flattened and becoming integral welds when the cover and body are secured together as by ultrasonic welding in order to provide a protective barrier around the high voltage terminal.

2. A socket as defined in claim 1, in which the body and cover have a large keyed center hole, and in which the inside face of the cover as molded has a peripheral welding ridge around its outer periphery and another around the center hole, whereby the cover may be and in the finished socket is secured to the body by ultrasonic welding without the use of rivets.

3. A socket as defined in claim 2, in which the inside face of the cover as molded has a plurality of locking posts, and in which the body has mating holes to receive the locking posts, the posts being headed and the holes in the body being shaped to receive the headed posts with a snap engagement which allows for the presence of the welding ridges, whereby said posts hold the body and cover together with the metal contacts therebetween to facilitate handling of the socket before and during the welding operation.

4. A socket as defined in claim 3, in which the inner face of the cover as molded has an arcuate recess which is generally circular but interrupted outside the aforesaid welding ridges around the high voltage contact, a mating arcuate metal ground plate in said recess, and an arcuate insulation spacer disposed over said ground plate, said insulation spacer being apertured at the location of a contact which is to be protected by spark gap action.

5. A socket as defined in claim 4, in which the thickness of the insulation spacer is selected to obtain a desired breakdown voltage, and in which the thickness of the metal ground plate is so selected that when added to the thickness of the insulation spacer the summed thickness equals the depth of the arcuate recess in the cover.

6. A socket as defined in claim 5, in which the arcuate insulation spacer is wider than the arcuate metal ground plate, and in which the arcuate recess in the cover has a narrower deeper portion dimensioned to receive and locate the ground plate, and a wider portion dimensioned to receive and locate the spacer.

7. A socket as defined in claim 6, in which the locking posts are generally cylindrical with a channel at the inner side of the post which channel stops short of the tip in order to provide a desired enlarged head on the post, said channel conforming to a circular hole passing through the cover, and in which the holes in the body for receiving the posts are cylindrical in the part nearer the inner face, but are flattened in the part nearer the outer face in order to provide the desired snap engagement with the enlarged heads of the locking posts.

8. A socket as defined in claim 1, in which the inside face of the cover as molded has a plurality of locking posts, and in which the body has mating holes to receive the locking posts, the posts being headed and the holes in the body being shaped to receive the headed posts with a snap engagement, whereby said posts hold the body and cover together with the metal contacts therebetween to facilitate handling of the socket before and during the welding operation.

9. A socket as defined in claim 8, in which the locking posts are generally cylindrical with a channel at the inner side of the post which channel stops short of the tip in order to provide a desired enlarged head on the post, said channel conforming to a hole passing through the cover, and in which the holes in the body for receiving the posts are in the part nearer the inner face, but are flattened in the part nearer the outer face in order to provide the desired snap engagement with the enlarged heads of the locking posts.

10. A socket as defined in claim 1, in which the inner face of the cover as molded has an arcuate recess which is generally circular but interrupted outside the aforesaid welding ridges around the high voltage contact, a mating arcuate metal ground plate in said recess, and an arcuate insulation spacer disposed over said ground plate, said insulation spacer being apertured at the location of a contact which is to be protected by spark gap action.

11. A socket as defined in claim 10, in which the thickness of the insulation spacer is selected to obtain a desired breakdown voltage, and in which the thickness of the metal ground plate is so selected that when added to the thickness of the insulation spacer the summed thickness equals the depth of the recess in the cover.

12. A socket as defined in claim 10, in which the arcuate insulation spacer is wider than the arcuate metal ground plate, and in which the arcuate recess in the cover has a narrower deeper portion dimensioned to receive and locate the ground plate, and a wider portion to receive and locate the spacer.

13. A kinescope socket comprising a molded body having a generally flat outer face, a ring of axially directed holes with channels extending outwardly therefrom, a ring of metal contacts with axially directed pin grips received in said holes and with wire clamps received in said channels, a molded cover which on the inside face as molded has a peripheral welding ridge around its outer periphery and another around the center hole, whereby the cover may be and in the finished socket is secured to the body by ultrasonic welding without the use of rivets, the cover as molded having an arcuate recess, a mating arcuate metal ground plate in said recess, an arcuate insulation spacer disposed over said ground plate, said insulation spacer being apertured at the location of a contact which is to be protected by spark gap action, said spacer being wider than said ground plate, the arcuate recess in the cover having a narrower deeper portion dimensioned to receive and locate the ground plate, and a wider portion to receive and locate the spacer.

14. A socket as defined in claim 13, in which the inside face of the cover as molded has a plurality of locking posts, and in which the body has mating holes to receive the locking posts, the posts being headed and the holes in the body being shaped to receive the headed posts with a snap engagement, whereby said posts hold the body and cover together with the metal contacts therebetween to facilitate handling of the socket before and during the welding operation.

References Cited

UNITED STATES PATENTS

| | | | |
|---|---|---|---|
| 2,411,861 | 12/1946 | Antony et al. | 339—217 |
| 3,224,916 | 12/1965 | Soloff et al. | 156—73 |
| 3,227,910 | 1/1966 | Pittman | 339—193 X |
| 3,240,980 | 3/1966 | Schuster | 339—193 X |
| 3,278,886 | 10/1966 | Blumenberg et al. | 339—193 X |
| 3,335,394 | 8/1967 | Miller | 339—208 X |
| 3,377,612 | 4/1968 | Klier et al. | 339—193 X |

RICHARD E. MOORE, *Primary Examiner.*

JOHN R. MOSES, *Assistant Examiner.*

U.S. Cl. X.R.

339—193